(12) United States Patent
Tsai (10) Patent No.: US 11,848,750 B2
(45) Date of Patent: Dec. 19, 2023

(54) RADIO FREQUENCY INTERFERENCE MITIGATION WITH ADAPTIVE LOCAL OSCILLATOR

(71) Applicant: MediaTek Inc., Hsinchu (TW)

(72) Inventor: Yu-Tai Tsai, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/892,114

(22) Filed: Aug. 21, 2022

(65) Prior Publication Data
US 2023/0291494 A1  Sep. 14, 2023

Related U.S. Application Data

(60) Provisional application No. 63/317,563, filed on Mar. 8, 2022.

(51) Int. Cl.
  H04B 1/00  (2006.01)
  H04K 3/00  (2006.01)
(52) U.S. Cl.
  CPC ............. H04K 3/25 (2013.01); H04B 1/0082 (2013.01); H04K 3/224 (2013.01)
(58) Field of Classification Search
  CPC ......... H04K 3/25; H04K 3/224; H04B 1/0082
  See application file for complete search history.

(56) References Cited

U.S. PATENT DOCUMENTS

| 9,413,402 B1* | 8/2016 | Mayer ..................... H03D 1/04 |
| 2008/0182511 A1 | 7/2008 | Adkins et al. | |
| 2009/0305643 A1* | 12/2009 | Sayers ................. H04B 1/1027 455/68 |
| 2014/0270019 A1 | 9/2014 | Ly-Gagnon et al. | |
| 2018/0183636 A1 | 6/2018 | Ganesan et al. | |

FOREIGN PATENT DOCUMENTS

WO   WO 2015100725 A1   7/2015

OTHER PUBLICATIONS

Taiwan Intellectual Property Office, Office Action for Taiwan Patent Application No. 111145866, dated Jan. 11, 2023.
European Patent Office, Extended European Search Report in European Patent Application No. 23157565.5, dated Jun. 29, 2023.

* cited by examiner

*Primary Examiner* — Keith Ferguson
(74) *Attorney, Agent, or Firm* — Han IP PLLC; Andy M. Han (57) ABSTRACT

Various schemes for mitigating radio frequency (RF) interference are described, wherein an adaptive local oscillator (LO) is utilized. A receiver measures a jamming indicator which indicates a total power within a receiving band of the receiver. If the jamming indicator indicates a presence of substantial in-band interference, the receiver may program the LO to a different frequency and/or adjust a bandwidth of a filter accordingly to reject or reduce the interference. The receiver may adjust the LO and/or the filter repeatedly until the interference is rejected to a point that de-sense to the signal intended to be received is satisfactorily mitigated. The receiver may restore the LO and the filter to a default setting when the jamming indicator indicates that the interference is no longer present.

20 Claims, 6 Drawing Sheets

FIG. 6

RADIO FREQUENCY INTERFERENCE MITIGATION WITH ADAPTIVE LOCAL OSCILLATOR

CROSS REFERENCE TO RELATED PATENT APPLICATION

The present disclosure is part of a non-provisional patent application claiming the priority benefit of U.S. Provisional Patent Application No. 63/317,563, filed on 8 Mar. 2022, the content of which being incorporated by reference in its entirety.

TECHNICAL FIELD

The present disclosure is generally related to wireless communication, and more particularly, to methods and apparatus for mitigating radio frequency interference using an adaptive local oscillator.

BACKGROUND

Unless otherwise indicated herein, approaches described in this section are not prior art to the claims listed below and are not admitted as prior art by inclusion in this section.

Wireless communication has become ever more indispensable in modern-day living. Radio and television broadcast, cellular communication (e.g., LTE®, 5G, 6G cell phone services), Wi-Fi communication, Bluetooth®, satellite broadcast, geofencing, radio frequency identification (RFID), Internet-of-Things (IoT), global positioning system (GPS) and other global navigation satellite systems (GNSS), etc., various technologies supporting different communication needs are constantly transmitting wireless signals, often referred to as radio frequency (RF) signals, in the air, the transmission medium for the wireless signals. Ideally, different wireless services would transmit respective RF signals using different radio bands, i.e., different frequencies or frequency sections of the radio spectrum, to avoid interfering with each other. Nevertheless, interference may still happen when electronic devices (e.g., cell phones, radio receivers, GPS receivers, etc.) process the RF signals. For example, reciprocal mixing may occur, wherein RF signals at different frequencies are mingled onto a same frequency band through a down-converting process. As a consequence of the reciprocal mixing, unwanted signals would coexist with the intended signal within the same frequency band, causing RF interference, or "de-sense". That is, the ability for a RF receiver to sense or otherwise detect the intended signal is compromised or negatively affected due to the interference caused by the unwanted signals being concurrently present within the same frequency band along with the intended signal.

Various techniques demonstrated in the present disclosure may be employed to mitigate de-sense caused by RF interference, thereby enhancing the ability of the RF receiver to sense the intended signal.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to enhancing the sensitivity of an RF receiver by avoiding or reducing RF interference. It is believed that with the various embodiments in the present disclosure, benefits including improved coding latency, higher coding throughput, and/or reduced hardware overhead are achieved.

In one aspect, a method is presented for a RF receiver to mitigate RF interference. The method may involve measuring a jamming indicator, which is an indication of how much RF interference the RF receiver is currently subject to. With a local oscillator (LO) of the RF receiver programmed at a first frequency, the method may measure the jamming indicator to be a first value. The first value may be greater than a predefined threshold, which indicates that the RF interference is too high, or the de-sense too much, for the RF receiver to achieve satisfactory performance. In the event that the first value is greater than a predefined threshold, the method may also involve programming the LO at a second frequency that is different than the first frequency, followed by measuring the jamming indicator having a second value with the LO programmed at the second frequency. The method may further involve operating the RF receiver with the LO programmed at the second frequency if the second value as measured is not greater than the threshold. If the second value as measured is still greater than the threshold, the method may involve programming the LO at yet another frequency (e.g., a third frequency that is different than the first and second frequencies), and more other frequencies if necessary, until the jamming indicator becomes not greater than the threshold, an indication that the RF interference is successfully mitigated. The method may then involve operating the RF receiver with the LO set at the third frequency, i.e., the frequency that results in the jamming indicator being not greater than the threshold.

In some embodiments, the method may further involve adjusting a bandwidth of a low-pass filter (LPF) of the RF receiver in conjunction with the frequency adjustment of the LO. That is, the LPF may be programmed at a corresponding bandwidth each time the LO frequency is programmed. Different LO frequencies may have different corresponding LPF frequencies. After the LO and the LPF are adjusted to achieve a jamming indicator that is not greater than the predefined threshold, the method may involve operating the RF receiver with the current LO and LPF settings, i.e., the LO and LPF settings that collectively result in the jamming indicator being not greater than the threshold.

In another aspect, an apparatus is presented which comprises a front-end (FE) module that is configured to convert a radio frequency (RF) signal to a baseband (BB) signal. The FE module may comprise a local oscillator (LO), a mixer, a low-pass filter (LPF), as well as a processor. The LO is configured to generate a LO signal having a periodic waveform (e.g., a sinusoidal wave) at a certain frequency. The LO may be adaptive in a way that the frequency of the LO signal is programmable. The mixer is configured to generate a mixed signal by mixing the RF signal with the LO signal through a nonlinear operation. The nonlinear operation creates replicas of the RF signal at harmonic frequencies of the LO signal. The LPF is configured to apply an analog filtering function to the mixed signal, i.e., the replicas at the harmonic frequencies, thereby generating the BB signal. The processor is configured to program the LO and the LPF at different settings for measuring a jamming indicator. Based on the measured values of the jamming indicator at different LO and/or LPF settings, the processor may operate the FE module with a LO/LPF setting that gives a jamming indicator value that is below a predefined threshold. For example, the processor may be configured to perform operations including: programming the LO to generate the LO signal at a first frequency; programming the LPF to apply the analog filtering function of a first bandwidth (BW) to the mixed signal; measuring, based on the BB signal, a jamming indicator having a first value; programming the LO to generate the LO signal at a second frequency different than the first frequency responsive to the first value being greater than a threshold; programming the LPF to apply the analog filtering function of a second BW different than the first BW to the mixed signal responsive to the first value being greater than the threshold; measuring, based on the BB signal, the jamming indicator having a second value; operating the FE module with the LO programmed at the second frequency and the LPF programmed at the second BW responsive to the second value being not greater than the threshold.

It is noteworthy that, although description provided herein below may be in the context of certain wireless communication or radio access technologies such as global positioning system (GPS) or other global navigation satellite systems (GNSS), the proposed concepts, schemes and any variation(s)/derivative(s) thereof may be implemented in, for and by other types of radio access technologies such as, for example and without limitation, Wi-Fi, Bluetooth, Zig-Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein below.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to realizing efficient in-loop filtering for a video encoder or decoder. According to the present disclosure, a number of possible solutions may be implemented separately or jointly. That is, although these possible solutions may be described below separately, two or more of these possible solutions may be implemented in one combination or another.

Figure 1:
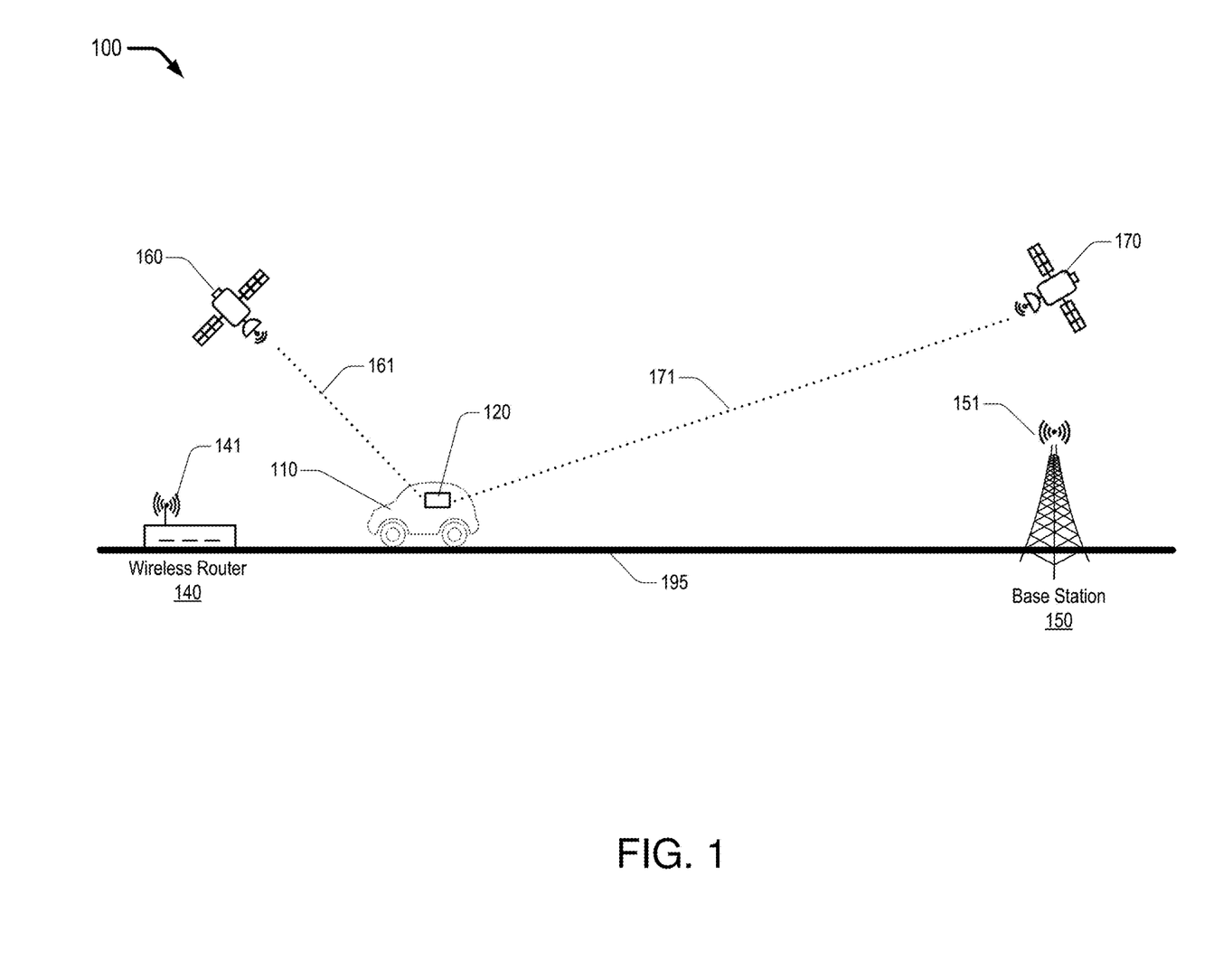
FIG. 1 is a diagram of an example wireless communication environment in which various solutions and schemes in accordance with the present disclosure may be implemented.

FIG. 1 is a diagram of an example wireless communication environment 100 in which various solutions and schemes in accordance with the present disclosure may be implemented. FIG. 2~FIG. 6 illustrate examples of implementation of various proposed schemes in the wireless communication environment 100 in accordance with the present disclosure. The following description of various proposed schemes is provided with reference to FIG. 1~FIG. 6.

Referring to FIG. 1, the wireless communication environment 100 may involve one or more radio frequency (RF) transmitters 160 and 170 and a RF receiver 120 communicating wirelessly. In some embodiments, the RF transmitters 160 and 170 may be two of the plurality of satellites of a global positioning system (GPS) or other global navigation satellite systems (GNSS). While orbiting the earth, each of the satellites 160 and 170 may broadcast wireless signals, such as positioning signals 161 and 171, respectively, toward the earth. The RF receiver 120 may receive and process the positioning signals 161 and 171 to determine a current location of the RF receiver 120 on the earth. The RF receiver 120 may be provided in a vehicle 110 that moves or navigates on a land or water surface 195 of the earth. Based on the current location and a map system embedded or otherwise stored in the RF receiver 120, the RF receiver 120 may further provide navigation guidance to a local or remote driver for navigating the vehicle 110.

Each of the positioning signals 161 and 171 may be a modulated signal, namely, a baseband signal modulated on an RF carrier. The modulation scheme employed by contemporary GNSS may be a digital modulation scheme, such as Quadrature Amplitude Modulation (QAM), Phase Shift Keying (PSK), Frequency Shift Keying (FSK), Bi-Phase Shift Keying (BPSK) or Quadrature Phase Shift Keying (QPSK). The carrier frequency of the positioning signals 161 and 171 may vary depending on the transmission band the satellites 160 and 170 employ. For example, satellites 160 and 170 may transmit the positioning signals 161 and 171 in the L1 band of GPS, the carrier frequency of which is 1575.42 megahertz (MHz), or in the L2 band of GPS, the carrier frequency of which is 1227.6 MHz. Newer GPS satellites may employ the L5 band of GPS, the carrier frequency of which is 1176.45 MHz. In an event that the satellites 160 and 170 belong to a GPS transmitting on the L5 band, each of the positioning signals 161 and 171 has a baseband bandwidth of 20.46 MHz that is modulated on a carrier of 1176.45 MHz. Namely the positioning signals 161 and 171 occupy a band of the wireless spectrum, wherein the band has a center frequency at 1176.45 MHz, a low-end frequency at 1166.22 MHz and a high-end frequency at 1186.68 MHz. The difference between the high-end frequency and the low-end frequency is equal to the baseband bandwidth, i.e., 20.46 MHz.

The RF receiver 120's capability of determining the current location of the RF receiver 120 is affected by the quality of the positioning signals 161 and 171 as received by the RF receiver 120, which may be manifested or represented using a figure of merit called carrier-to-noise ratio (CNR). The CNR, or sometimes referred to as $C/N_0$, represents the ratio of the signal strength of a digitally modulated signal, such as the positioning signal 161 or 171, to the power density of the noise, both present at the RF receiver 120. The signal strength may be represented with the unit of decibel-milliwatt (dBm), whereas the power density of the noise may be represented with the unit of milliwatt per hertz (mW/Hz). Therefore, $C/N_0$ is often expressed using the unit of decibel-hertz (dB-Hz). The higher the CNR, the better the quality of the modulated signal, as the strength (i.e., power) of the meaningful information (i.e., the baseband signal) in the digitally modulated signal is much higher than that of the unwanted information (e.g., noise or interference) therein. Therefore, it is desired for the RF receiver 120 to receive the positioning signal 161 or 171 having a high CNR as they arrive at the RF receiver 120.

As described elsewhere herein above, various wireless technologies provide different services or applications that may interfere with one another, as the wireless signals from the different transmitters are transmitted or otherwise broadcast in or through the same transmission medium, i.e., the air, or the atmosphere around the earth. An RF receiver may thus receive unwanted signals along with the intended signal, whereas the unwanted signals become noise or interference to the intended signal. The sensitivity of the RF receiver may thus be negatively impacted, or "de-sensed", due to the presence of the unwanted signals. Referring to FIG. 1, the RF receiver 120, while receiving the intended signals 161 and 171 transmitted from the satellites 160 and 170, may also receive certain power of RF signals 141 and 151, which are respectively broadcast into the air by a wireless router 140 and a base station 150 of a cellular phone network. The RF signals 141 and 151 received by the RF receiver 120 thus become noise or interference to the intended signals 161 and 171 and may thus "de-sense" the RF receiver 120 by impairing its sensitivity to the intended signals 161 and 171.

In some embodiments in accordance with the present disclosure, the RF receiver 120 may incorporate an adaptive local oscillator (LO) that is configured to generate a LO signal having a periodic waveform (e.g., a sinusoidal wave) at a certain oscillation frequency. In an event that the RF receiver 120 is de-sensed by an RF interference or noise signal, such as the Wi-Fi signal 141 broadcast by the wireless router 140 and/or the RF signal 151 broadcast by the base station 150, the RF receiver 120 may adaptively adjust the oscillation frequency of the LO to mitigate the interference and reduce the amount of de-sense the RF receiver 120 is subject to, as described in detail elsewhere herein below.

Illustrative Implementations

Figure 2:
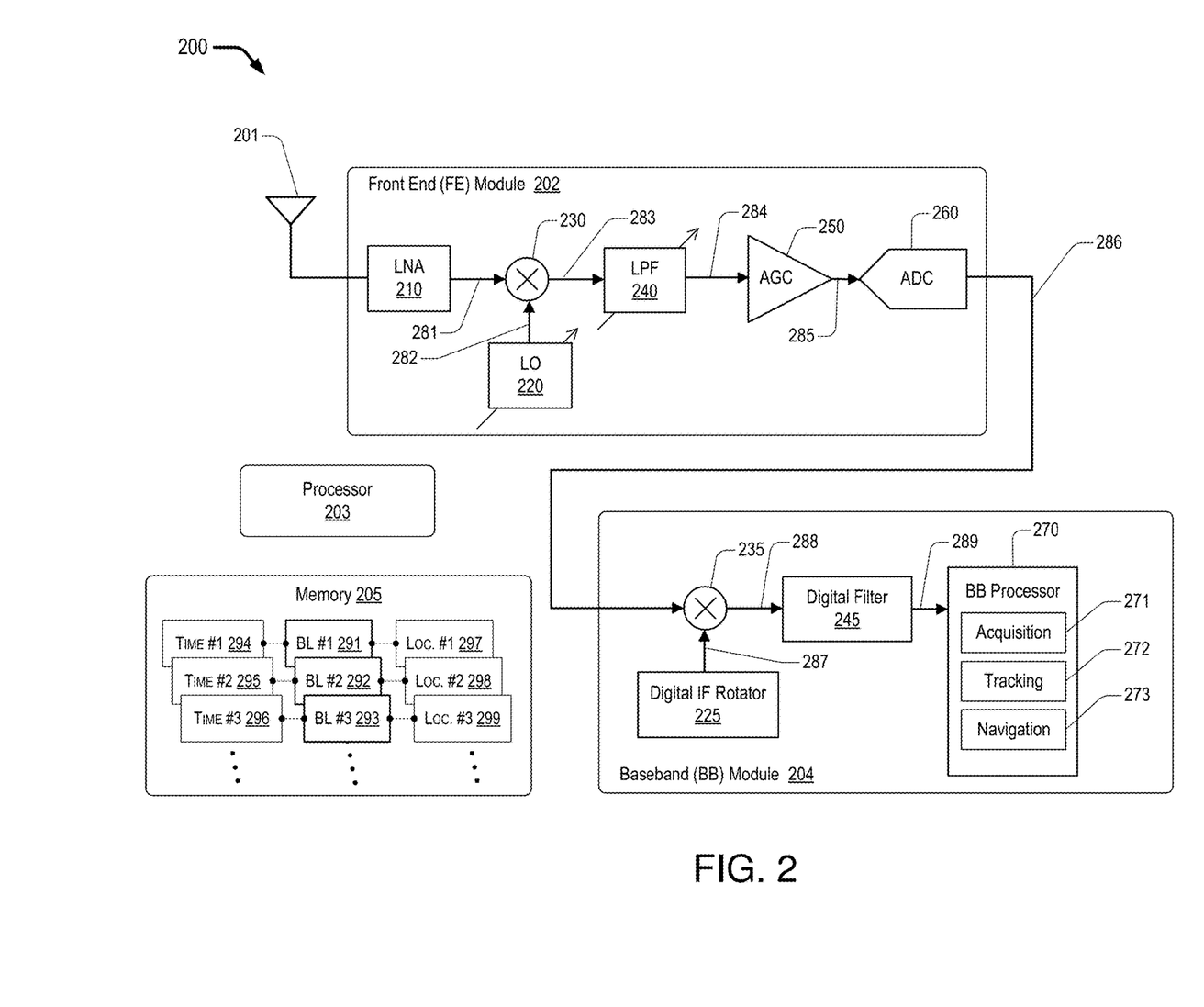
FIG. 2 is a diagram of an example design in accordance with an implementation of the present disclosure.

FIG. 2 is a diagram of an example design in accordance with an implementation of the present disclosure, wherein an RF receiver 200 is illustrated. The RF receiver 200 may embody the RF receiver 120. The RF receiver 200 may process an intended RF signal that is subject to interference from unwanted RF signals or other RF noise sources. The RF receiver 200 has several components or modules, including some components selected from an antenna 201, a front-end (FE) module 202, a processor 203, a baseband (BB) module 204, and a storage device or memory 205. The FE module 202 may include some components selected from a low-noise amplifier (LNA) 210, an adaptive local oscillator (LO) 220, an analog mixer 230, an adaptive analog low-pass filter (LPF) 240, an automatic gain controller (AGC) 250, and an analog-to-digital converter (ADC) 260. The BB module 204 may include some components selected from a digital intermediate frequency (IF) rotator 225, a digital mixer 235, a digital filter 245, and a BB processor 270. The BB processor 270 may include some components selected from an acquisition sub-module 271, a tracking sub-module 272, and a navigation sub-module 273.

In some embodiments, the modules 201-205 as listed above, at least certain components thereof, are modules of software instructions being executed by one or more processing units (e.g., a processor) of a computing device or electronic apparatus. In some embodiments, the modules 201-205, at least certain components they include, are modules of hardware circuits implemented by one or more integrated circuits (ICs) of an electronic apparatus. Though the modules 201-205 are illustrated as being separate modules, some of the modules can be combined into a single module.

The antenna 201 is used to interface with the transmission medium (i.e., the air, the atmosphere, or the vacuum) of RF signals that are manifested in the form of electromagnetic (EM) wave. The antenna 201 may capture a portion of the power of the EM waves, which is subsequently amplified by the LNA 210 of the FE module 202 to generate an RF signal 281. The LNA 210 is configured to provide a substantially fixed-gain amplification over a relatively wide RF bandwidth.

The FE module 202 may be configured to convert the RF signal 281 to a BB signal 284. Components including the LO 220, the mixer 230, and the LPF 240 may collectively convert the RF signal 281 to the BB signal 284, with each of the components performing a respective signal processing function in the analog domain. Specifically, the LO 220 is configured to generate a LO signal 282, which has a periodic waveform (e.g., a sinusoidal wave) oscillating at a certain frequency, often referred to as the LO frequency. The mixer 230 is configured to generate a mixed signal 283 by mixing or otherwise processing the RF signal 281 and the LO signal 282 through a nonlinear operation. In the frequency domain, the nonlinear operation creates replicas of the RF signal 281 at harmonic frequencies of the LO signal 282. The LPF 240 is configured to apply an analog filtering function to the mixed signal 283, thereby generating the BB signal 284. The filtering function of the LPF 240 is a low-pass filtering function having a specific bandwidth (BW). That is, among the replicas, only the replica at the baseband (i.e., with a center frequency at DC, or 0 Hz) may remain after passing the LPF 240 and become the BB signal 284.

For instance, the RF receiver 200 may embody the RF receiver 120 and receive the satellite signal 161 broadcast from the GNSS satellite 160. The GNSS satellite 160 may broadcast the satellite signal 161 using the L5 band of GPS, which has a carrier frequency at 1176.45 MHz. Specifically, the satellite signal 161 is a 1176.45 MHz RF signal modulated by a BB signal having a BB bandwidth of 20.46 MHz (i.e., from −10.23 MHz to 10.23 MHz on frequency spectrum). In the frequency domain, the satellite signal 161 is a signal having a center frequency at 1176.45 MHz and a bandwidth of 20.46 MHz. Namely, the satellite signal 161, and thus the RF signal 281, occupies a band on the frequency spectrum from a low end of 1166.22 MHz to a high end of 1186.68 MHz. Correspondingly, the LO 220 is configured to generate the LO signal 282 having a frequency at the carrier frequency of the satellite signal 161, i.e., also at 1176.45 MHz. Consequently, after the mixer 230 mixes the RF signal 281 with the LO signal 282, the mixed signal 283 contains a baseband replica of the RF signal 281, as well as other replicas of the RF signal 281. Each of the replicas of the RF signal 281 has a center frequency at a respective harmonic of the LO frequency 1176.45, i.e., at N*1176.45 MHz, wherein N is an integer. The baseband replica refers to the replica with N=0 (i.e., the center frequency of 0 Hz), whereas each of the other replicas corresponds to N being a non-zero integer. The baseband replica of the RF signal 281 occupies a band on the frequency spectrum from a low end of −10.23 MHz to a high end of 10.23 MHz. The LPF 240 may be configured to have a passband BW of 32 MHz for filtering the mixed signal 283, thereby generating the BB signal 284, which contains only the baseband replica of the RF signal 281, i.e., the intended BB signal to be received.

Figure 3:
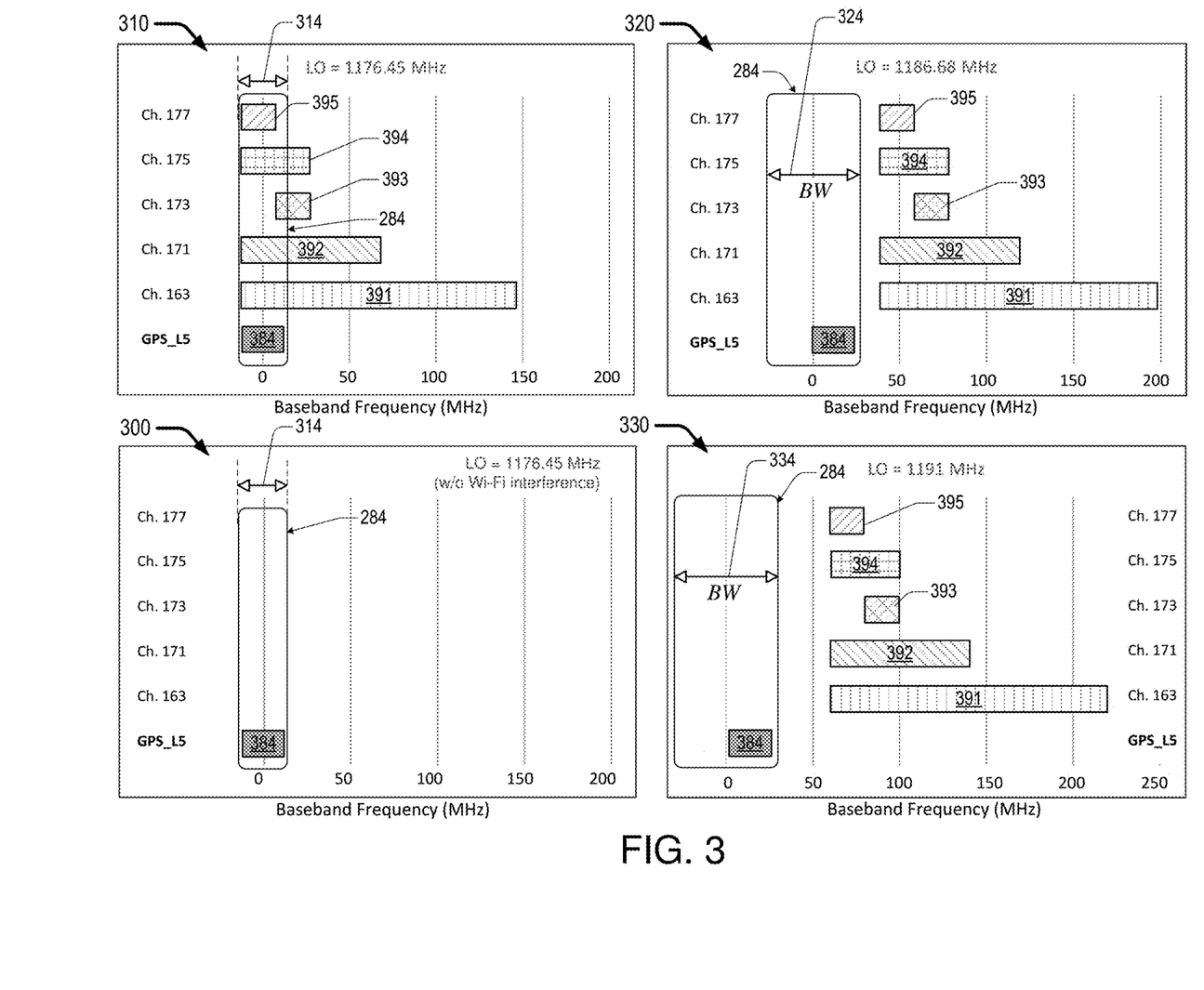
FIG. 3 is a diagram of an example design in accordance with an implementation of the present disclosure.

FIG. 3 illustrates diagrams 300, 310, 320 and 330 of an example design in accordance with an implementation of the present disclosure, wherein each of the diagrams 300, 310, 320 and 330 demonstrates a baseband portion of the mixed signal 283, i.e., the spectrum of the mixed signal 283 in a vicinity of 0 Hz. Moreover, each of the diagrams 300 and 310 illustrates the baseband portion of the mixed signal 283 when the LO signal 282 is programmed at a default LO frequency, i.e., same as the carrier frequency of the GPS signal 161, namely, 1176.45 MHz for the GPS L5 band. The difference between the diagrams 300 and 310 resides in whether RF interference is present or not in the RF signal received by the antenna 201. Specifically, for the diagram 300, the antenna 201 receives the satellite signal 161 without RF interference or noise such as the RF signals 141 and 151. For example, the vehicle 110 may be at a location far away from the wireless router 140 and the base station 150 in the scenario represented by the diagram 300, so that the RF signal received by the antenna 201 contains literally no power from the RF signals 141 and 151. On the other hand, for the diagram 310, the antenna 201 receives not only the satellite signal 161 but also some of the Wi-Fi signal 141 broadcast from the wireless router 140. For example, the vehicle 110 may be at a location rather close to the wireless router 140, and thus the RF signal received by the antenna 201 contains a significant amount of power of the Wi-Fi signal 141 in addition to the GPS signal 161.

The baseband replica of the GPS signal 161 as present in the mixed signal 283 is represented in each of the diagrams 300, 310, 320 and 330 by the block labeled with a numeral 384. The location of the block 384 in the frequency spectrum varies depending on the LO frequency of the LO 220. For the diagrams 300 and 310, the LO frequency is programmed to be the same as the carrier frequency of the GPS signal 161, at 1176.45 MHz. Accordingly, the block 384 in the diagrams 300 and 310 has the center frequency at 0 Hz, with the low and high ends at −10.23 MHz and 10.23 MHz, respectively. On the other hand, for the diagrams 320 and 330, the LO 220 is programmed to have the LO frequency different from the carrier frequency of the GPS signal 161, and thus the block 384 occupies different bands of the frequency spectrum. Specifically, for the diagram 320, the LO 220 is programmed at 1186.68 MHz, which results in the block 384 of the diagram 320 having the low and high ends at 0 MHz and 20.46 MHz, respectively. For the diagram 330, the LO 220 is programmed at 1191 MHz, which results in the block 384 in the diagram 320 having the low and high ends at 4.32 MHz and 24.78 MHz, respectively.

The wireless router 140 may be a part of a wireless local area network (WLAN) operating in accordance with one or more Institute of Electrical and Electronics Engineers (IEEE) 802.11 standards. Therefore, the RF signal 141 may include signals transmitted using one or more of the wireless channels defined in the IEEE 802.11 standards, e.g., channel No. 163, 171, 173, 175, and 177 as defined in IEEE 802.11a/n/ac/ax standards. Specifically, the Wi-Fi channel No. 163 has a 160 MHz bandwidth, with the center frequency at 5815 MHz and the low and high ends of the channel at 5735 MHz and 5895 MHz, respectively. The Wi-Fi channel No. 171 has an 80 MHz bandwidth, with the center frequency at 5855 MHz and the low and high ends of the channel at 5815 MHz and 5895 MHz, respectively. The Wi-Fi channel No. 173 has a 20 MHz bandwidth, with the center frequency at 5865 MHz and the low and high ends of the channel at 5855 MHz and 5875 MHz, respectively. The Wi-Fi channel No. 175 has a 40 MHz bandwidth, with the center frequency at 5875 MHz and the low and high ends of the channel at 5855 MHz and 5895 MHz, respectively. The Wi-Fi channel No. 177 has a 20 MHz bandwidth, with the center frequency at 5885 MHz and the low and high ends of the channel at 5875 MHz and 5895 MHz, respectively.

As described above, the Wi-Fi signal 141 transmitted in accordance with the IEEE 802.11a/n/ac/ax standards employs a frequency band in the vicinity of 5.7-5.9 gigahertz (GHz), whereas the GPS signal 161 transmitted in the GPS L5 band occupies employs a frequency band in the vicinity of 1.15-1.2 GHz. The two signals occupy two respective RF bands that are far apart from one another, and thus there is no interference between the Wi-Fi signal 141 and the GPS signal 161 when the antenna 201 receives them, or in the RF signal 281 after passing through the LNA 210. However, interference between the two signals may occur in the mixed signal 283, i.e., after the Wi-Fi signal 141 and the GPS signal 161 are down-converted to baseband by the mixer 230. For example, in the scenario corresponding to the diagram 310, the antenna 201 receives significant power of the Wi-Fi signal 141. Consequently, the mixed signal 283, and the baseband portion thereof, contains baseband replicas of the Wi-Fi signal 141. As shown in the diagram 310, the baseband replicas of the Wi-Fi signal 141 are represented in the diagram 310 by blocks 391, 392, 393, 394 and 395. Specifically, the block 391 represents the baseband replica of the Wi-Fi signal 141 transmitted in the Wi-Fi channel No. 163. The block 392 represents the baseband replica of the Wi-Fi signal 141 transmitted in the Wi-Fi channel No. 171. The block 393 represents the baseband replica of the Wi-Fi signal 141 transmitted in the Wi-Fi channel No. 173. The block 394 represents the baseband replica of the Wi-Fi signal 141 transmitted in the Wi-Fi channel No. 175. The block 395 represents the baseband replica of the Wi-Fi signal 141 transmitted in the Wi-Fi channel No. 177.

As shown in the diagram 310, each of the baseband replicas of the Wi-Fi signal 141, i.e., the blocks 391, 392, 393, 394 and 395, overlaps at least partially with the intended baseband signal 384. The overlapping of the spectrums in the diagram 310 indicates an interference of the Wi-Fi signal 141 with the GPS signal 161 in the mixed signal 283. In contrast, in the scenario corresponding to the diagram 300, since the antenna 201 receives insignificant power of the Wi-Fi signal 141 and the cellular signal 151, the RF signal 281 contains only the GPS signal 161. Consequently, the mixed signal 283, and the baseband portion thereof, contain only the baseband replica of the GPS signal 161, which is represented by the block 384.

Also shown in each of the diagrams 300, 310, 320 and 330 is the BB signal 284, which is a filtered version of the mixed signal 283. The bandwidth of the LPF 240 is represented by an indicator 314 in the diagrams 300 and 310. Comparing the diagrams 300 and 310, it is clearly shown that in the diagram 300 that the BB signal 284 includes only the block 384, i.e., the baseband replica of the GPS signal 161, which is the signal the RF receiver 200 intends to receive. On the other hand, in the diagram 310, the BB signal 284 includes not only the block 384, but also at least a portion of each of the blocks 391-395. The inclusion of at least a portion of the blocks 391-395 in the BB signal 284 indicates the interference of the Wi-Fi signal 141 with the GPS signal 161 in the BB signal 284. Namely, whereas the block 384 represents the GPS signal that the receiver 200 intends to receive in the BB signal 284, the portion of each of the blocks 391-395 included in the BB signal 284 represents unwanted noise or interference. The interference thus reduces the CNR of the BB signal 284, thereby "de-sensing" the receiver 200's sensitivity to detect the GPS signal 161. Depending on the Wi-Fi channel used, experiment data shows that the de-sense caused by the Wi-Fi signal 141 may be as much as 10 dB or more. For example, in an event that the Wi-Fi signal 141 is transmitted using the channel No. 173 or 177 with a total channel power of 22 dBm, and the GPS signal 161 received at the antenna 201 being −130 dBm, the CNR of the BB signal 284 may degrade as much as 10 dB, from 40.5 dB-Hz corresponding to the diagram 300 to 30.5 dB-Hz corresponding to the diagram 310. In an event that the Wi-Fi signal 141 is transmitted using the channel No. 175, the CNR of the BB signal 284 may degrade as much as 11 dB, from 40.5 dB-Hz corresponding to the diagram 300 to 29.5 dB-Hz corresponding to the diagram 310. In an event that the Wi-Fi signal 141 is transmitted using the channel No. 171 or 163, the CNR of the BB signal 284 may degrade as much as 4 dB, from 40.5 dB-Hz corresponding to the diagram 300 to 36.5 dB-Hz corresponding to the diagram 310.

According to an aspect of the present disclosure, the de-sense of the receiver 200 due to the RF interference from the Wi-Fi signal 141 may be mitigated by the processor 203 adaptively adjusting the frequency of the LO signal 282. A shown in the diagram 320, with the LO 220 programmed to generate the LO signal 282 at a higher frequency of 1186.68 MHz as compared to the LO frequency of 1176.45 MHz of the diagram 310, each of the baseband replicas 384 and 391-395 accordingly shifts higher in the spectrum. Specifically, the block 384 in the diagram 320 is shifted towards the high end of the spectrum as compared to the diagram 310, with the low and high ends respectively at 0 MHz and 20.46 MHz in the diagram 320. Each of the blocks 391-395 is also shifted higher in the spectrum in the diagram 320 as compared to the diagram 310. The block 391 is shifted higher and has the low and high ends at 38.4 MHz and 198.4 MHz, respectively. The block 392 is shifted higher and has the low and high ends at 38.4 MHz and 118.4 MHz, respectively. The block 393 is shifted higher and has the low and high ends at 58.4 MHz and 78.4 MHz, respectively. The block 394 is shifted higher and has the low and high ends at 38.4 MHz and 78.4 MHz, respectively. The block 395 is also shifted higher and has the low and high ends at 38.4 MHz and 58.4 MHz, respectively. As shown in the diagram 320, the shifts in the spectrum resulted from the frequency adjustment of the LO signal 282 cause a separation between the signal (represented by the block 384) and the interference (represented by the blocks 391-395). Moreover, none of the blocks 391-395 is overlapped, not even partially, with the block 384. Namely, none of the baseband replicas of the Wi-Fi signal 141 is co-existent with the baseband replica of the GPS signal 161 over a same frequency band. The LPF 240 may therefore effectively reject the interference in the mixed signal 283, thereby generating the BB signal 284 that includes only the block 384 but none of the blocks 391-395, as shown in the diagram 320. Consequently, the de-sense of the receiver 200 due to the Wi-Fi signal 141 is mitigated. In fact, the wireless router 140 may transmit the Wi-Fi signal 141 using any of the Wi-Fi channels No. 163, 171, 173, 175 and 177, and the resulted de-sense to the receiver 200 is insignificant. For example, the Wi-Fi signal 141 may be transmitted using any of the Wi-Fi channels No. 163, 171, 173, 175 and 177 with a total channel power of 22 dBm. Experiment data show that, with the GPS signal 161 received at the antenna 201 being −130 dBm, the CNR of the BB signal 284 may degrade from 40.5 dB-Hz by as much as less than 1 dB.

Based on the diagrams 310 and 320 of FIG. 3 and the experiment data disclosed above, the RF receiver 200 that intends to detect the GPS signal 161 transmitted on the GPS L5 band is able to effectively mitigate receiver de-sense resulted from the Wi-Fi signal 141 by adjusting the frequency of the LO signal 282 from 1176.45 MHz to 1186.68 MHz. In an event that the adjustment of the LO signal 282 from 1176.45 MHz to 1186.68 MHz does not yield a satisfactory improvement on the receiver de-sense, the processor 203 may further adjust the frequency of the LO signal 282 to further separate the interference (represented by the blocks 391-395) from the intended signal (represented by the block 384). The wider separation between the signal and the interference translates to an even less amount of de-sense caused by the interference. For example, the diagram 330 illustrates the spectrum of the signal and the interference with the LO 220 programmed at 1191 MHz. As shown in the diagram 330, each of the baseband replicas 384 and 391-395 accordingly shifts to an even higher band in the spectrum. Specifically, the block 384 in the diagram 330 is shifted towards the high end of the spectrum as compared to the diagram 320, with the low and high ends respectively at 4.32 MHz and 24.78 MHz in the diagram 330. Each of the blocks 391-395 is also shifted higher in the spectrum in the diagram 330 as compared to the diagram 320. The block 391 in the diagram 330 has the low and high ends at 60 MHz and 220 MHz, respectively. The block 392 in the diagram 330 has the low and high ends at 60 MHz and 140 MHz, respectively. The block 393 in the diagram 330 has the low and high ends at 80 MHz and 100 MHz, respectively. The block 394 in the diagram 330 has the low and high ends at 60 MHz and 100 MHz, respectively. The block 395 in the diagram 330 has the low and high ends at 60 MHz and 80 MHz, respectively. That is, as compared with the diagram 320, the interference (represented by the blocks 391-395) in the diagram 330 is separated further from the signal (represented by the block 384). Specifically, the separation between the signal and the interference in the diagram 320 is 17.94 MHz, whereas that in the diagram 330 is 35.22 MHz. The wider separation between the signal and the interference translates to an even less amount of de-sense caused by the interference. The wider separation between the signal and the interference also facilitates a less complicated design of the LPF 240. For example, the wider separation of the diagram 330 would not require as sharp a roll-off at the edge of passband of the LPF 240 as required in the diagram 320. Therefore, the LPF 240 may employ a less complicated structure, e.g., a lower order filter may suffice as the LPF 240 given a wider separation between the signal and the interference, which may translate into a lower hardware cost and a smaller operation power of the LPF 240.

In addition to adjusting the LO 220 for changing the frequency of the LO signal 282, the processor 203 may also adjust the bandwidth of the LPF 240 accordingly. As shown in diagrams 310, 320 and 330, as the frequency of the LO signal 282 is adjusted from the default LO frequency 1176.45 MHz to 1186.68 MHz to 1191 MHz, the baseband replica of the GPS signal 161, i.e., the block 384, is also shifted higher and higher. Therefore, the processor 203 may need to adjust the bandwidth of the LPF 240 to be wider and wider. Specifically, the LPF 240 may have a bandwidth 314, 324 and 334 for the LO frequency of 1176.45 MHz, 1186.68 MHz, and 1191 MHz, respectively, whereas the bandwidth 324 is wider than the bandwidth 314, and the bandwidth 334 is wider than the bandwidth 324. Namely, the farther the LO frequency away from the default LO frequency, the wider the BW of the LPF 240. In some embodiments, the bandwidth 314 may be 32 MHz, the bandwidth 324 may be 47 MHz, and the bandwidth 334 may be 56 MHz.

In some embodiments, the FE module 202 may also include an AGC 250 and an ADC 260. The AGC 250 may include a variable gain amplifier (VGA) to amplify the BB signal 284 to a signal 285. The AGC 250 may also include closed-loop feedback regulation circuitry to adjust the gain of the VGA such that the signal 285 may have a signal swing that matches a rated input swing of the ADC 260. The ADC 260 may convert the signal 250 from the analog domain to the digital domain, thereby generating a corresponding digital signal 286 that is sent to the BB module 204 for further processing in the digital domain. The digital signal 286 thus contains the same information as the BB signal 284.

The components of the BB module 204 are configured to operate in the digital domain. Specifically, the digital IF rotator may provide an IF signal 287 to the digital mixer 235, which may modulate the IF signal 287 with the digital signal 286 to generate a mixed signal 288. The mixed signal 288 may be processed by the digital filter 245 to generate a digital BB signal 289. In order to generate the digital BB signal 289, the digital filter 245 may be configured to apply a digital filtering function to the mixed signal 288. The digital filtering function applied to the digital mixed signal 288 is similar to the analog filtering function applied by the LPF 240 to the analog mixed signal 283, except that the digital filtering function is performed in the digital domain whereas the analog filtering function is performed in the analog domain. Similar to the analog filtering function, the digital filtering function also performs low-pass filtering, with a bandwidth that corresponds to, but smaller than, the bandwidth of the analog filtering function. That is, the processor 203 may program the bandwidth of the digital filter 245 according to the bandwidth of the LPF 240. Moreover, the processor 203 may program the bandwidth of the digital filter 245 to be the same or smaller than that of the LPF 240 so as to further reduce noise in the digital BB signal 289. In addition, the digital filter 245 may be configured to have a faster roll-off at the edge of the passband than the LPF 240. The faster roll-off is intended to help reducing the in-band rejection of the interference and noise.

The digital BB signal 289 may be further processed by the BB processor 270. In some embodiments, the receiver 200 may be a GPS receiver, and the BB processor 270 may process the BB signal 289 using the acquisition sub-module 271, the tracking module 272, and the navigation sub-module 273. The acquisition sub-module 271 is configured to determine a current location of the receiver 200 based on the BB signal 289. The tracking sub-module 272 is configured to track the movement of the receiver 200 based on the BB signal 289. The navigation sub-module 273 is configured to provide navigation information and/or navigation directions to a driver based on the current location generated by the acquisition sub-module 271, the movement information of the receiver 200 generated by the tracking sub-module 272, as well as map data stored in the memory 205.

To determine whether interference is present in a receiving band of the receiver 200 and de-sense may have occurred to the receiver 200 due to the interference, the processor 203 may configure the FE module 202 to measure a jamming indicator, based on which the processor 203 may determine that de-sense may have occurred. The processor 203 may then program the LO 220, or both of the LO 220 and the LPF 240, as described elsewhere herein above, to mitigate the de-sense. The jamming indicator is determined or otherwise calculated based on an instantaneous power of the BB signal 284 and a baseline power level of the BB signal 284. In general, the baseline power level represents the power level of the BB signal 284 when no or very little interference is present. For example, the power of the BB signal 284 as illustrated in the diagram 300 may be designated as the baseline power level. When interference is present, e.g., as illustrated in the diagram 310, the instantaneous power of the BB signal 284 becomes higher than the baseline power level due to the inclusion of the interference (e.g., any of the blocks 391-395) in the bandwidth 314 of the LPF 340. The jamming indicator, often presented in dB, is defined by the ratio between the instantaneous power of the BB signal 284 and the baseline power level. The processor 203 may calculate the jamming indicator based on the baseline power level and the measured instantaneous power of the BB signal 284. The processor 203 may then determine that de-sense has occurred in an event that the jamming indicator exceeds a predefined threshold, e.g., 3 dB or 5 dB. That is, in an event that the instantaneous power of the BB signal 284 is higher than the baseline power level by the threshold or more, the processor 203 may determine that de-sense has occurred and accordingly try to mitigate the interference by adjusting the LO 220, or both the LO 220 and the LPF 240, as described elsewhere herein above.

The baseline power level may be established or otherwise designated using an average value (e.g., a mean average, a median average, or a mode average) of the instantaneous power of the BB signal 284. The average value may be computed over a predetermined period of time or moving distance. For example, as the vehicle 110 traverses the earth surface 195 carrying the GPS receiver 200, the processor 203 may record or otherwise measure the instantaneous power of the BB signal 284 over a predefined period of time (e.g., five minutes) or a predefined moving distance that the vehicle 110 traverses (e.g., 2 kilometers). The processor 203 may then designate an average value of the power of the BB signal 284 over the predefined period of time or moving distance as the baseline power level. After the baseline power level is determined, the processor 203 may then periodically calculate the jamming indicator using the baseline power level and the instantaneous power of the BB signal 284. The processor 203 may calculate the jamming indicator at a millisecond level, e.g., once every few milliseconds. In an event that the vehicle 110 moves close to the wireless router 140, the instantaneous power of the BB signal 284 may increase due to the inclusion of Wi-Fi signal 141 in the BB signal 284, resulting in a higher value of the jamming indicator. If the jamming indicator exceeds the predefined threshold, the processor 203 may start to the process of mitigating the de-sense by adjusting the frequency setting of the LO 220 and the bandwidth setting of the LPF 240, e.g., as shown in the diagram 320 or 330.

In some embodiments, in mitigating de-sense, the processor 203 may program the LO 220 by using a substantially fixed increment, e.g., 5 MHz, in adjusting the frequency of the LO signal 282. The processor 203 may keep adjusting the frequency of the LO signal 282 with the fixed increment until the jamming indicator becomes not greater than the predefined threshold. However, there is a limit in the frequency range over which the LO 220 may be tuned. In an event that the jamming indicator remains greater than the threshold across the whole range over which the LO 220 may be tuned, the processor 203 may determine to program the LO 220 at the frequency that yields the lowest value of the jamming indicator. For example, the LO 220 may have a limited tunable range from 1170 MHz to 1190 MHz. In an event of interference due to the Wi-Fi signal 141, the processor 203 may measure a jamming indicator of 15 dB when the LO 220 is programmed at the default frequency, i.e., at the carrier frequency of the GPS signal 161, 1176.45 MHz, as shown in the diagram 310. Meanwhile, the LPF 240 is programmed to have the bandwidth 314 equal to 32 MHz. Since the jamming indicator of 15 dB is greater than a predefined threshold of 3 dB, the processor 203 tries to mitigate the interference by programming the LO 220 to a different frequency, at 1186.68 MHz, as shown in the diagram 320. Meanwhile, the LPF 240 is programmed to have the bandwidth 324 equal to 47 MHz. The processor 203 may then measure the jamming indicator under this setting to be 7 dB, which is still higher than the predefined threshold of 3 dB. Subsequently, the processor 203 tries to mitigate the interference by programming the LO 220 to yet another frequency, at 1170 MHz. Meanwhile, the LPF 240 is programmed to have a bandwidth of 40 MHz. The processor 203 may then measure the jamming indicator under this setting to be 5 dB, which is still higher than the predefined threshold of 3 dB. Since the lowest value of the jamming indicator among the three settings is 5 dB, which corresponds to the LO frequency of 1170 MHz, the processor 203 may thus determine to operate the receiver 200 with the LO 220 programmed at 1170 MHz and the LPF 240 programmed at 40 MHz, since this setting gives the lowest jamming indicator of 5 dB, albeit still higher than the predefined threshold of 3 dB.

In some embodiments, the processor 203 may periodically re-measure and update the baseline power level while the vehicle 110 traverses the earth surface 195. In some embodiments, the processor 203 may further store the baseline power level in the memory 205, such as baseline entries 291, 292 and 293. In some embodiments, the memory 205 may be a non-volatile memory. In some embodiments, each time the processor 203 stores an entry of the baseline power level in the memory 205, the processor 203 may also store a corresponding time stamp (e.g., a time stamp 294, 295 or 296) and/or a corresponding location stamp (e.g., a location stamp 297, 298 or 299). For example, when the processor 203 stores the baseline entry 291 in the memory 205, the processor 203 may also store the corresponding time stamp 294 and/or the corresponding location stamp 297. The time stamp 294 records the time when the processor 203 determines the baseline power level 291, whereas the location stamp 297 records the location (e.g., a geographical coordinate) of the RF receiver 200 at which the processor 203 determines the baseline power level 291. The location of the receiver 200 may be provided by the acquisition sub-module 271.

In some embodiments, the processor 203 may load a baseline entry from the memory 205 as the baseline power level based on which the jamming indicator is calculated. For example, the processor 203 may designate a latest baseline power level among the baseline entries stored in the memory 205 as the baseline power level based on which the jamming indicator is calculated. The processor 203 may examine the time stamps corresponding to the baseline entries stored in the memory 205 and designate the baseline entry having the most recent time stamp as the latest baseline power level.

In some embodiments, the processor 203 may load a baseline entry from the memory 205 as the baseline power level based on which the jamming indicator is calculated. For example, the processor 203 may designate a vicinity baseline power level among the baseline entries stored in the memory 205 as the baseline power level based on which the jamming indicator is calculated. The processor 203 may examine the location stamps corresponding to the baseline entries stored in the memory 205 and designate the baseline entry having the location stamp that is the closest to the current location of the receiver 200 as the vicinity baseline power level. The current location of the receiver 200 may be provided by the acquisition sub-module 271.

To measure the jamming indicator, the processor 203 may measure or otherwise evaluate the instantaneous power of the BB signal 284 using the value of the digital signal 286. To this end, the AGC 250 may be disabled, i.e., configured to provide a specific (i.e., constant) gain. Namely, the AGC 250 has a special configuration for measuring the instantaneous power of the BB signal 284 using the value of the digital signal 286, wherein the AGC 250 is configured to provide the specific gain regardless of the size of the signal swing of the BB signal 284. Each measurement of the instantaneous power of the BB signal 284 associated with the jamming indicator or the baseline power level is supposed to be conducted with the AGC 250 configured in this special configuration.

Even if the processor 203 operates the FE module 202 with the LO 220 and the LPF 240 configured to be different from their respective default settings for the purpose of mitigating RF interference, the processor 203 may restore the LO 220 and the LPF 240 to their respective default settings as soon as the RF interference is removed or no longer present (e.g., when the vehicle 110 moves sufficiently away from the wireless router 140 and the base station 150). To this end, the processor 203 may periodically and temporarily reset the LO 220 and the LPF 240 back to their respective default settings and measure the instantaneous power of the BB signal 284. If the measured instantaneous power is still higher than the baseline power level by more than the threshold, it may indicate that the RF interference still persists. However, if the measured instantaneous power returns to be within the threshold from the baseline power level, it may indicate that the RF interference is no longer present. The processor 203 may then operates the FE module 202 with the LO 220 and the LPF 240 restored back to their respective default settings. This may further reduce the noise level and hence enhance the sensitivity of the RF receiver 200 because the default bandwidth of the LPF 240 (e.g., the bandwidth 314) is smaller than the LPF bandwidth used with the shift of the LO frequency (e.g., the bandwidth 324 or 334), thereby further reducing the in-band noise.

Illustrative Processes

Figure 4:
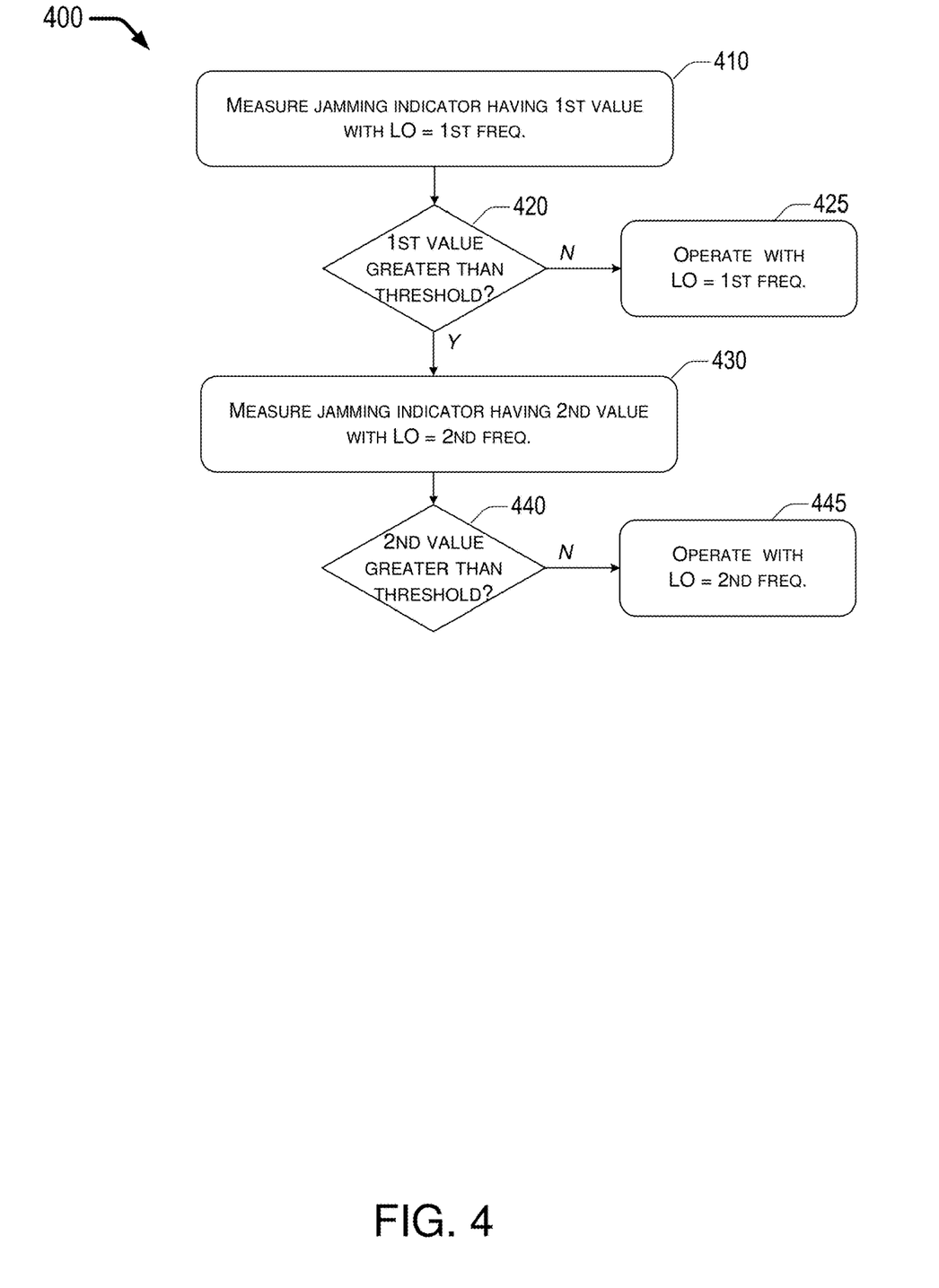
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to mitigating radio frequency (RF) interference using an adaptive local oscillator in accordance with the present disclosure. Process 400 may include one or more operations, actions, or functions as illustrated by one or more of blocks 410, 420, 425, 430, 440 and 445. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed repeatedly or iteratively. Process 400 may be implemented by or in the apparatus 200 as well as any variations thereof. Solely for illustrative purposes and without limiting the scope, process 400 are described below in the context of the apparatus 200. Process 400 may begin at block 410.

At 410, process 400 may involve the apparatus 200 measuring a jamming indicator having a first value with a local oscillator (LO) thereof programmed at a first frequency. For example, the processor 203 may program the LO 220 to generate the LO signal 282 at the first frequency, e.g., the default LO frequency of 1176.45 MHz, same as the carrier frequency of the GPS signal 161. Moreover, the processor 203 may measure the jamming indicator based on the BB signal 284. The processor 203 may measure the jamming indicator by firstly measuring the power of the BB signal 284, and secondly calculating a ratio between the power of the BB signal 284 and a baseline power level. The power of the BB signal 284 may be represented in a digital format using the digital signal 286. In some embodiments, the processor 203 may determine the baseline power level by designating an average value of the power of the BB signal 284 as the baseline power level. The average value may be measured over a predefined period of time or a predefined moving distance of the apparatus 200. In some embodiments, the apparatus 200 may include a non-volatile memory 205, which is used to record history-based entries of the baseline power level. The processor 203 may access the memory 205 and designate a most recent entry among the history-based entries stored in the memory 205 as the baseline power level for measuring the jamming indicator. In some embodiments, the processor 203 may use a vicinity baseline power level stored in the memory 205 for measuring the jamming indicator. Process 400 may proceed from 410 to 420.

At 420, process 400 may involve the processor 203 comparing the measured jamming indicator (i.e., the first value) with a predefined threshold, both of which are usually expressed in decibels (dB). The jamming indicator being not greater than the threshold indicates that the RF interference may only cause insignificant de-sense to the apparatus 200, in which case process 400 may proceed from 420 to 425. In an event that jamming indicator measured at 410 is greater than the threshold, which indicates significant de-sense, process 400 may proceed from 420 to 430.

At 425, process 400 may involve the apparatus 200 operating with the LO programmed the first frequency.

At 430, process 400 may involve the apparatus 200 measuring the jamming indicator having a second value with the LO thereof programmed at a second frequency different than the first frequency. For example, the processor 203 may program the LO 220 to generate the LO signal 282 at the second frequency, e.g., 1186.68 MHz. Moreover, the processor 203 may measure the jamming indicator again, this time with the LO 220 programmed at the second frequency. The jamming indicator measured at block 430 may have a second value that is different from the first value measured at the block 410. Process 400 may proceed from 430 to 440.

At 440, process 400 may involve the processor 203 comparing the jamming indicator measured at 430 (i.e., the second value) with the predefined threshold. The second value being not greater than the threshold indicates that the de-sense to the apparatus 200 is insignificant with the LO 220 programmed at the second frequency, in which case process 400 may proceed from 440 to 445.

At 445, process 400 may involve the apparatus 200 operating with the LO programmed at the second frequency.

Figure 5:
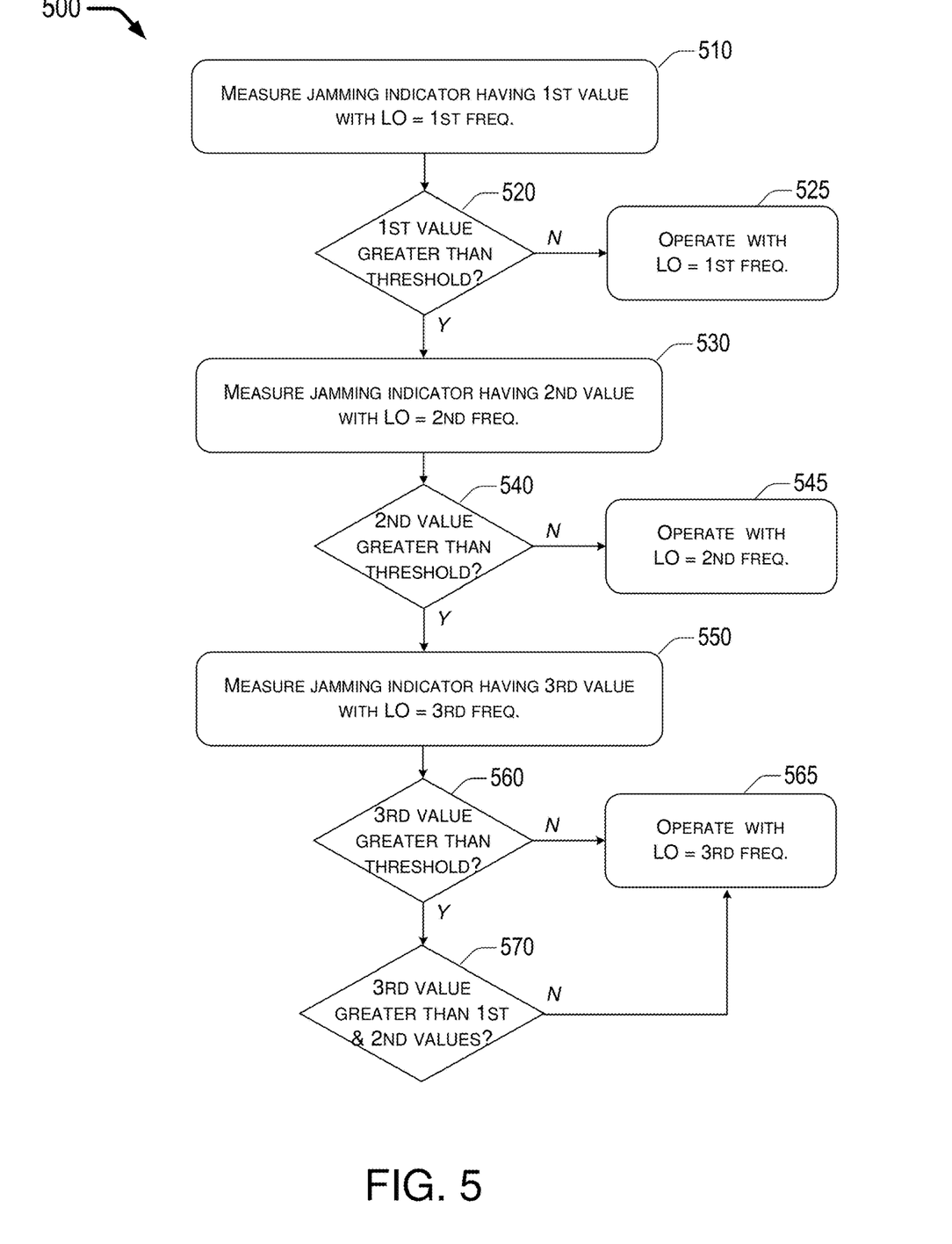
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to mitigating RF interference using an adaptive local oscillator in accordance with the present disclosure. Process 500 may include one or more operations, actions, or functions as illustrated by one or more of blocks 510, 520, 525, 530, 540, 545, 550, 560, 565 and 570. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed repeatedly or iteratively. Process 500 may be implemented by or in the apparatus 200 as well as any variations thereof. Solely for illustrative purposes and without limiting the scope, process 500 are described below in the context of the apparatus 200. Process 500 may begin at block 510.

Block 510 is identical to block 410. Process 500 may proceed from 510 to 520.

Block 520 is identical to block 420. In an event that the first value is not greater than the threshold, process 500 may proceed from 520 to 525. In an event that the first value is greater than the threshold, process 500 may proceed from 520 to 530.

Block 525 is identical to block 425.

Block 530 is identical to block 430. Process 500 may proceed from 530 to 540.

Block 540 is identical to block 440. In an event that the second value is not greater than the threshold, process 500 may proceed from 540 to 545. In an event that the second value is greater than the threshold, process 500 may proceed from 540 to 550.

Block 545 is identical to block 445.

At 550, process 500 may involve the apparatus 200 measuring the jamming indicator having a third value with the LO thereof programmed at a third frequency different than the first frequency and the second frequency. For example, the processor 203 may program the LO 220 to generate the LO signal 282 at the third frequency, e.g., 1191 MHz. The third frequency may be the last LO frequency the adaptive LO 220 is able to provide. That is, the adaptive LO 220 may be able to generate the LO signal 282 at one of the first, the second, and the third frequencies, i.e., 1176.45 MHz, 1186.68 MHz, and 1191 MHz, but not any other frequencies. Namely, as process 500 proceeds from 510 to 520 to 530 to 540 and then to 550, process 500 has depleted all LO frequency options that the LO 220 is able to provide. Moreover, the processor 203 may measure the jamming indicator again at 550, this time with the LO 220 programmed at the third frequency. The jamming indicator measured at block 550 may have a third value that is different from the first value measured at the block 510 and also different from the second value measured at the block 530. Process 500 may proceed from 550 to 560.

At 560, process 500 may involve the processor 203 comparing the jamming indicator measured at 550 (i.e., the third value) with the predefined threshold. The third value being not greater than the threshold indicates that the de-sense to the apparatus 200 is insignificant with the LO 220 programmed at the third frequency, in which case process 500 may proceed from 560 to 565. In an event that jamming indicator measured at 550 is greater than the threshold, which indicates significant de-sense, process 500 may proceed from 560 to 570.

At 565, process 500 may involve the apparatus 200 operating with the LO programmed at the third frequency.

At 570, process 500 may involve the processor 203 comparing the jamming indicator measured at 550 (i.e., the third value) with the jamming indicator measured at 510 (i.e., the first value) and the jamming indicator measured at 530 (i.e., the second value). Since each of the first value, the second value and the third value are greater than the predefined threshold, the de-sense to the apparatus 200 is not insignificant in any of the three cases. Process 500 may thus involve operating the apparatus 200 with the LO signal 282 that results in the lowest value of jamming indicator among the first, the second and the third values, even though all the three values are greater than the predefined threshold. In an event that the third value is not greater than the first value, and also not greater than second value, process 500 may proceed from 570 to 565.

Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 6:
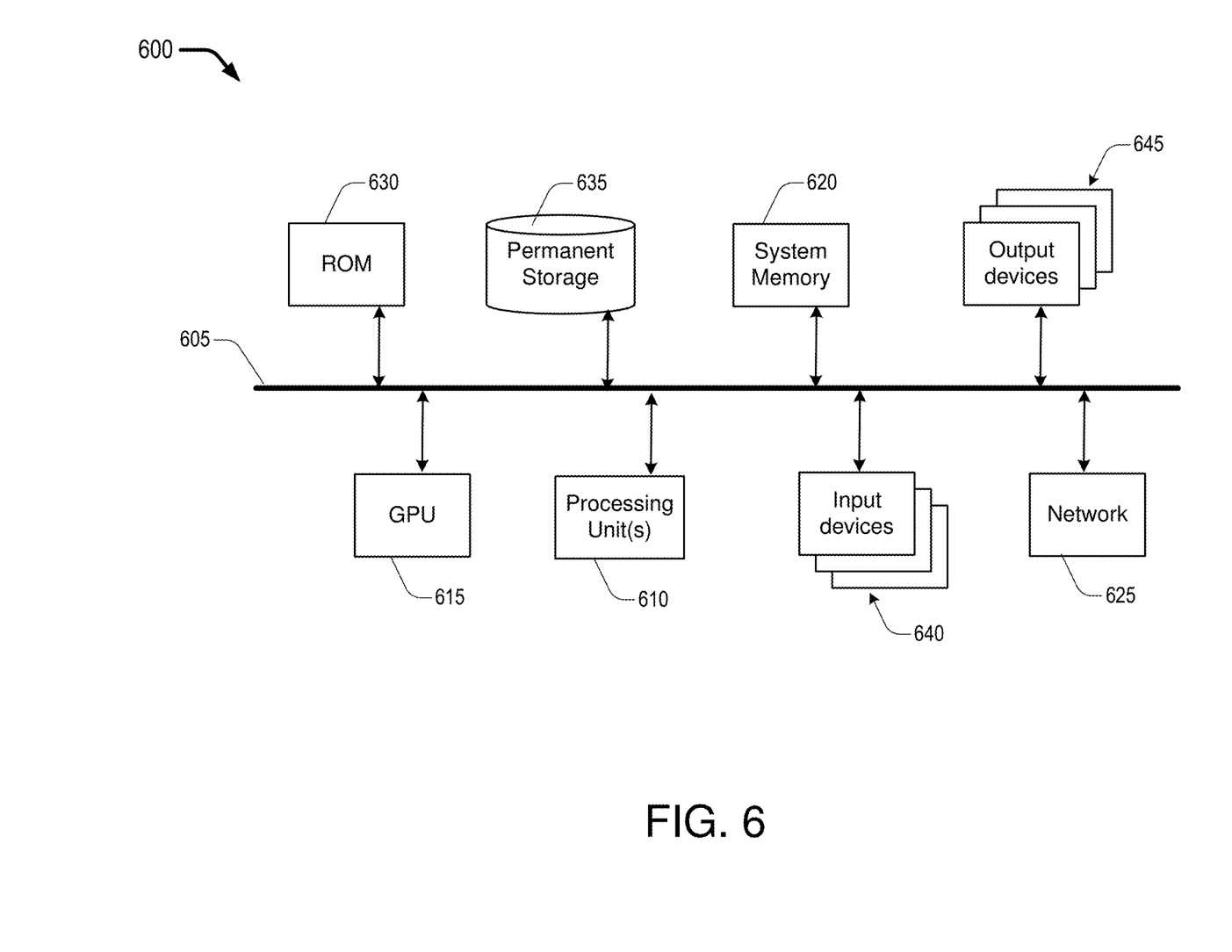
FIG. 6 is a diagram of an example electronic system in accordance with an implementation of the present disclosure.

FIG. 6 conceptually illustrates an electronic system 600 with which some embodiments of the present disclosure are implemented. The electronic system 600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 600 includes a bus 605, processing unit(s) 610, a graphics-processing unit (GPU) 615, a system memory 620, a network 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the GPU 615, the read-only memory 630, the system memory 620, and the permanent storage device 635.

From these various memory units, the processing unit(s) 610 retrieves instructions to execute and data to process in order to execute the processes of the present disclosure. The processing unit(s) may be a single processor or a multi-core processor in different embodiments. Some instructions are passed to and executed by the GPU 615. The GPU 615 can offload various computations or complement the image processing provided by the processing unit(s) 610.

The read-only-memory (ROM) 630 stores static data and instructions that are used by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the present disclosure use a mass-storage device (such as a magnetic or optical disk and its corresponding disk drive) as the permanent storage device 635.

Other embodiments use a removable storage device (such as a floppy disk, flash memory device, etc., and its corresponding disk drive) as the permanent storage device. Like the permanent storage device 635, the system memory 620 is a read-and-write memory device. However, unlike storage device 635, the system memory 620 is a volatile read-and-write memory, such a random access memory. The system memory 620 stores some of the instructions and data that the processor uses at runtime. In some embodiments, processes in accordance with the present disclosure are stored in the system memory 620, the permanent storage device 635, and/or the read-only memory 630. For example, the various memory units include instructions for processing multimedia clips in accordance with some embodiments. From these various memory units, the processing unit(s) 610 retrieves instructions to execute and data to process in order to execute the processes of some embodiments.

The bus 605 also connects to the input and output devices 640 and 645. The input devices 640 enable the user to communicate information and select commands to the electronic system. The input devices 640 include alphanumeric keyboards and pointing devices (also called "cursor control devices"), cameras (e.g., webcams), microphones or similar devices for receiving voice commands, etc. The output devices 645 display images generated by the electronic system or otherwise output data. The output devices 645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 6, bus 605 also couples electronic system 600 to a network 625 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    measuring, with a local oscillator (LO) of a radio frequency (RF) receiver programmed at a first frequency, a jamming indicator having a first value;
    programming the LO at a second frequency different than the first frequency responsive to the first value being greater than a threshold;
    measuring, with the LO programmed at the second frequency, the jamming indicator having a second value; and
    operating the RF receiver with the LO programmed at the second frequency responsive to the second value being not greater than the threshold.

2. The method of claim 1, further comprising:
    programming the LO at a third frequency different than the first and second frequencies responsive to the second value being greater than the threshold;
    measuring, with the LO programmed at the third frequency, the jamming indicator having a third value; and
    operating the RF receiver with the LO programmed at the third frequency responsive to the third value being greater than the threshold but not greater than the first and second values.

3. The method of claim 1, wherein:
    the measuring of the jamming indicator having the first value comprises measuring the jamming indicator having the first value with a low-pass filter (LPF) of the RF receiver programmed at a first bandwidth (BW),
    the measuring of the jamming indicator having the second value comprises measuring the jamming indicator having the second value with the LPF programmed at a second BW different than the first BW, and
    the operating of the RF receiver responsive to the second value being not greater than the threshold comprises operating the RF receiver with the LO programmed at the second frequency and the LPF programmed at the second BW.

4. The method of claim 3, wherein:
    the second frequency is farther away from a default LO frequency than the first frequency is, and
    the second BW is greater than the first BW.

5. The method of claim 1, wherein the measuring of the jamming indicator having the first or second value comprises:
    measuring an in-band power within a receiving band of the RF receiver; and
    calculating the first or second value of the jamming indicator by calculating a ratio between the in-band power and a baseline power level.

6. The method of claim 5, further comprising:
    determining the baseline power level prior to the measuring of the jamming indicator having the first value.

7. The method of claim 6, wherein the determining of the baseline power level comprises designating an average value of the in-band power as the baseline power level, and wherein the average value is measured over a predefined period of time or moving distance.

8. The method of claim 6, wherein the determining of the baseline power level comprises designating a latest baseline power level stored in a non-volatile memory of the RF receiver as the baseline power level, and wherein the method further comprises:
    storing the baseline power level to the non-volatile memory.

9. The method of claim 6, wherein the determining of the baseline power level comprises designating a vicinity baseline power level stored in a non-volatile memory of the RF receiver as the baseline power level, the vicinity baseline power level associated with a corresponding location in a vicinity of a current location of the RF receiver, and wherein the method further comprises:
    storing the baseline power level to the non-volatile memory.

10. The method of claim 1, further comprising:
    programming the LO at the first frequency after the operating of the RF receiver with the LO programmed at the second frequency;
    measuring, with the LO programmed at the first frequency, the jamming indicator having a third value; and
    operating the RF receiver with the LO programmed at the first frequency responsive to the third value being not greater than the threshold.

11. An apparatus, comprising:
    a front-end (FE) module configured to convert a radio frequency (RF) signal to a baseband (BB) signal, the FE module comprising:
        a local oscillator (LO) configured to generate a LO signal;
        a mixer configured to generate a mixed signal by mixing the RF signal with the LO signal through a nonlinear operation;
        a low-pass filter (LPF) configured to generate the BB signal by applying an analog filtering function to the mixed signal; and
    a processor configured to perform operations comprising:
        programming the LO to generate the LO signal at a first frequency;
        programming the LPF to apply the analog filtering function of a first bandwidth (BW) to the mixed signal;
        measuring, based on the BB signal, a jamming indicator having a first value;
        programming the LO to generate the LO signal at a second frequency different than the first frequency responsive to the first value being greater than a threshold;
        programming the LPF to apply the analog filtering function of a second BW different than the first BW to the mixed signal responsive to the first value being greater than the threshold;
        measuring, based on the BB signal, the jamming indicator having a second value; and operating the FE module with the LO programmed at the second frequency and the LPF programmed at the second BW responsive to the second value being not greater than the threshold.

12. The apparatus of claim 11, wherein the operations further comprise:
programming the LO to generate the LO signal at a third frequency different than the first and second frequencies responsive to the second value being greater than the threshold;
programming the LPF to apply the analog filtering function of a third BW different than the first BW and the second BW to the mixed signal responsive to the second value being greater than the threshold;
measuring, based on the BB signal, the jamming indicator having a third value; and
operating the FE module with the LO programmed at the third frequency and the LPF programmed at the third BW responsive to the third value being greater than the threshold but not greater than the first and second values.

13. The apparatus of claim 11, wherein:
the FE module further comprises:
a low-noise amplifier (LNA) having a fixed gain; and
an automatic gain controller (AGC) having a programmable gain,
the operations further comprise:
programming the programmable gain of the AGC at a first gain setting,
the measuring of the jamming indicator having the first value comprises measuring the BB signal with the AGC programmed to have the first gain setting, and
the measuring of the jamming indicator having the second value comprises measuring the BB signal with the AGC programmed to have the first gain setting.

14. The apparatus of claim 11, wherein:
the second frequency is farther away from a default LO frequency than the first frequency is, and
the second BW is greater than the first BW.

15. The apparatus of claim 11, further comprising:
a BB module configured to process the BB signal in a digital domain, the BB module comprising:
a digital filter configured to apply a digital filtering function of a third BW to the BB signal,
wherein the operations further comprise:
programming the third BW according to the first or second BW, the third BW smaller than the first or second BW.

16. The apparatus of claim 11, wherein the operations further comprise:
determining a baseline power level prior to the measuring of the jamming indicator having the first value, and
wherein the measuring of the jamming indicator having the first or second value comprises:
measuring power of the BB signal; and
calculating the first or second value of the jamming indicator by calculating a ratio between the power of the BB signal and the baseline power level.

17. The apparatus of claim 16, wherein the determining of the baseline power level comprises designating an average value of the power of the BB signal as the baseline power level, and wherein the average value is measured over a predefined period of time or moving distance.

18. The apparatus of claim 16, further comprising:
a non-volatile memory,
wherein the determining of the baseline power level comprises designating a latest baseline power level stored in the non-volatile memory as the baseline power level, and
wherein the operations further comprise:
storing the baseline power level to the non-volatile memory.

19. The apparatus of claim 16, further comprising:
a non-volatile memory,
wherein the determining of the baseline power level comprises designating a vicinity baseline power level stored in the non-volatile memory as the baseline power level, the vicinity baseline power level associated with a corresponding location in a vicinity of a current location of the apparatus, and
wherein the operations further comprise:
storing the baseline power level to the non-volatile memory.

20. The apparatus of claim 11, wherein the operations further comprise:
programming the LO to generate the LO signal at the first frequency after the operating of the FE module with the LO programmed at the second frequency;
programming the LPF to apply the analog filtering function of the first BW after the operating of the FE module with the LO programmed at the second frequency;
measuring, with the LO programmed at the first frequency and the LPF programmed at the first BW, the jamming indicator having a third value; and
operating the FE module with the LO programmed at the first frequency and the LPF programmed at the first BW responsive to the third value being not greater than the threshold.

* * * * *